(12) United States Patent
Kumar et al.

(10) Patent No.: US 10,518,464 B2
(45) Date of Patent: *Dec. 31, 2019

(54) METHOD AND SYSTEM FOR MOLDING OF A CONTAINER

(71) Applicant: DISCMA AG, Zürich (CH)

(72) Inventors: Pankaj Kumar, Dexter, MI (US); G. David Lisch, Jackson, MI (US); Kirk E. Maki, Tecumseh, MI (US); Robert A. Cooper, Grass Lake, MI (US)

(73) Assignee: Discma AG, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,734

(22) Filed: Aug. 10, 2018

(65) Prior Publication Data

US 2018/0345568 A1 Dec. 6, 2018

Related U.S. Application Data

(63) Continuation of application No. 14/900,970, filed as application No. PCT/US2013/048477 on Jun. 28, 2013, now Pat. No. 10,046,505.

(51) Int. Cl.
*B29C 49/46* (2006.01)
*B29C 49/58* (2006.01)
*B29C 49/78* (2006.01)
*B29C 49/16* (2006.01)
*B29L 31/00* (2006.01)
(Continued)

(52) U.S. Cl.
CPC .............. *B29C 49/46* (2013.01); *B29C 49/16* (2013.01); *B29C 49/58* (2013.01); *B29C 49/783* (2013.01); *B29C 49/06* (2013.01); *B29C 49/12* (2013.01); *B29C 49/4289* (2013.01); *B29C 2049/465* (2013.01); *B29C 2049/4652* (2013.01); *B29C 2049/4664* (2013.01); *B29C 2049/5803* (2013.01); *B29C 2049/5862* (2013.01); *B29C 2049/5868* (2013.01); *B29C 2049/5875* (2013.01); *B29K 2067/003* (2013.01); *B29K 2105/258* (2013.01); *B29L 2031/7158* (2013.01)

(58) Field of Classification Search
CPC ... B29C 2049/465; B29C 49/46; B29C 49/58; B29C 2049/4664; B29C 2049/4652; B29C 2049/5803; B29C 49/4289
See application file for complete search history.

(56) References Cited

U.S. PATENT DOCUMENTS

| | | |
|---|---|---|
| 7,473,388 B2 | 1/2009 | Desanaux et al. |
| 9,573,705 B2 | 2/2017 | Chauvin et al. |
| | (Continued) | |

FOREIGN PATENT DOCUMENTS

| | | |
|---|---|---|
| DE | 102004014653 | 10/2005 |
| EP | 2143543 | 1/2010 |
| | (Continued) | |

*Primary Examiner* — Robert B Davis
(74) *Attorney, Agent, or Firm* — Eric J. Sosenko; Jonathan P. O'Brien; Honigman LLP (57) ABSTRACT

A method and molding system for hydraulic blow molding of a container from a preform. The method precharges the molding medium within a fill head unit to a precharge pressure. During the injecting of the molding medium into the preform, the method further increases the pressure of the molding medium to a pressure greater than the precharge pressure.

21 Claims, 6 Drawing Sheets

(51) Int. Cl.
  *B29C 49/06* (2006.01)
  *B29C 49/12* (2006.01)
  *B29C 49/42* (2006.01)
  *B29K 67/00* (2006.01)
  *B29K 105/00* (2006.01)

(56) References Cited

U.S. PATENT DOCUMENTS

| | | |
|---|---|---|
| 10,046,505 B2 * | 8/2018 | Kumar .................... B29C 49/46 |
| 2005/0206044 A1 | 9/2005 | Higuchi |
| 2006/0097417 A1 | 5/2006 | Emmer |
| 2008/0164642 A1 | 7/2008 | Hirdina |
| 2009/0218733 A1 | 9/2009 | Andison |
| 2011/0094186 A1 | 4/2011 | Chauvin |
| 2011/0135778 A1 | 6/2011 | Andison et al. |
| 2011/0265433 A1 | 11/2011 | Chauvin et al. |
| 2012/0315348 A1 | 12/2012 | Wilson et al. |
| 2013/0106027 A1 | 5/2013 | Maki |
| 2013/0113143 A1 | 5/2013 | Fevre et al. |
| 2013/0122136 A1 | 5/2013 | Fevre et al. |

FOREIGN PATENT DOCUMENTS

| | | |
|---|---|---|
| FR | 2839277 | 11/2003 |
| FR | 2848906 | 6/2004 |

\* cited by examiner

METHOD AND SYSTEM FOR MOLDING OF A CONTAINER

CROSS REFERENCE TO RELATED APPLICATION

This application is a continuation of U.S. patent application Ser. No. 14/900,970 filed on Dec. 22, 2015, which is a U.S. national stage application of international application no. PCT/US13/048477 filed on Jun. 28, 2013, the contents of both of which are herein incorporated by reference in their entirety.

BACKGROUND

The present invention generally relates to molding of plastic containers from preforms. More particularly, the invention relates to the forming of a plastic container from a preform utilizing a hydraulic blow molding process.

Plastic containers are commonly used for the packaging of various products, such as liquid products (including viscous liquids products). One common type of plastic container is the blow molded plastic container, which is often formed of a polyester material, and more specifically, polyethylene terephthalate (PET). Blow molded plastic containers are typically formed by placing a heated preform into a blow mold and then blowing and inflating the preform with air until the preform contacts the interior surfaces of the mold cavity, which define the final shape of the desired container. Once the inflated preform has been held against the interior surfaces of the mold cavity by the pressure of the blow air for a length of time sufficient to "freeze" the plastic, the blow molded container is removed from the mold.

In traditional blow molding, after the heated preform has been introduced into the mold cavity, a stretch rod is often advanced within the preform to initiate longitudinal stretching of the preform before any significant radial expansion of the preform is undertaken by the introduction of blow air. The stretch rod will may remain within the preform during radial expansion and is retracted prior to removal of the resultant container from the molding machine.

The blow molded containers are then transported to the location where the containers will be filled with the intended product. This may include the packaging and shipping of the containers to a remote location or may involve the transfer of the containers to a local facility, where these final steps occur before being shipped to a retailer or end-user.

With the above method, blow molding and filling are distinct and separate steps in the process of producing a product filled container. A newer process involves the use of the actual end product in the molding of the container. Instead of utilizing air as a blowing medium, this new process utilizes a liquid end product, the product being packaged in the container and sold to the end consumer, as the container's molding medium. As used herein, this type of molding is referred to as hydraulic blow molding. In hydraulic blow molding, instead of air, the molding medium is the liquid that is intended to be packaged in the container.

Conventional blow molding, which uses air as a molding medium, utilizes a higher molding medium temperature than hydraulic blow molding. Generally, the temperature of the molding medium used in hydraulic blow molding is in the range of only 10° C. to 100° C. Additionally, because of the liquid nature of the molding medium used in hydraulic blow molding, heat is withdrawn preform at a rate that is faster than when air is the molding medium. Thus, problems may arise in connection with the axial stretching and radial expansion of the preform.

If the molding medium of hydraulic blow molding contacts the material of the preform prematurely, the molding medium can cause localized cooling of the material. This premature cooling can result in portions of the material insufficiently stretching and expanding and, therefore, insufficient and/or improper formation of the resulting container. Also, localized cooling of the material can cause the preform to blow-out, in the area of such cooling, during the molding of the container.

Is it therefore important to minimize the extent to which the molding medium prematurely contacts the plastic of the preform. In other words, it is important to minimize the length of time that the product is in contact with the material of the preform before the preform has been fully axially stretched and radially expanded into the final configuration of the container.

During hydraulic blow molding, a chamber or bore of the nozzle is filled with molding medium that has been delivered from a source at a predetermined system pressure. Once filled with the molding medium, an inlet valve closes thereby constraining the molding medium within the system. The system pressure of the molding medium at this point in in the molding process is minimal, generally in the range of 1 to 2 bar. Next, the outlet of the nozzle is opened, the molding medium is pressurized so as to rapidly increase the pressure within the system and eject the molding medium from the nozzle's outlet into the preform, which is located within a mold assembly associated with the system. However, the raising of the pressure in the system is not instantaneous. The initial pressure driving the molding medium may not be sufficient to ensure that the molding medium does not prematurely contact, or contact for too long a length of time, the material of the preform. If such contact does occur, the result may be the blowing out of the preform or an improperly formed container.

If too much pressure is initially generated within the nozzle before the nozzle's outlet is opened, it is possible that some of the molding medium may breach the seal and drip into the preform. This too may result in a localized cooling of part of the preform and in an improperly formed container.

SUMMARY

In overcoming the enumerated drawbacks and other limitations of the known technology, in one aspect the present invention provides a method and system for hydraulic blow molding a container from a plastic preform.

In another aspect, the invention provides a method of operating a molding system for hydraulic blow molding of a container from a preform, the molding system including a fill head unit, and the method comprising the steps of: providing a molding medium in liquid form and at a system pressure to the fill head unit; precharging the molding medium within the fill head unit to a precharge pressure, the precharging pressure being greater than the system pressure; and after precharging of the molding medium, injecting the molding medium from the fill head unit into the preform causing the preform to expand into the shape of the container under the influence of the molding medium.

In another aspect, during the step of injecting of the molding medium into the preform, the pressure of the molding medium is increased to a pressure greater than the precharge pressure.

In further aspect, the molding medium is held at the precharge pressure.

In another aspect of the invention, an outlet of the fill head unit is opened after the molding medium has been held at the precharge pressure.

In still another aspect, the precharge pressure is at least 3 bar.

In a further aspect of the invention, the precharge pressure is at least 5 bar.

In an additional aspect of the invention, an outlet of the nozzle body is closed when the molding medium is provided to the fill head unit and the outlet is opened after precharging the molding medium to the precharge pressure. In yet another aspect, the outlet is opened by retracting the seal pin within the nozzle body.

In still a further aspect of the invention, the molding medium is initially injected into the preform at the precharge pressure.

In an additional aspect, subsequent to the injecting of the molding medium into the preform at the precharge pressure, the molding medium is injected into the preform at a pressure greater than the precharge pressure.

In another aspect, the pressurization unit includes a fill piston located within a fill chamber containing the molding medium, the fill piston being moved to a precharge position during the precharging step.

In a further aspect, the fill piston is moved to the precharge position by an actuator.

In an additional aspect, the molding medium is provided to the fill head unit at a system pressure and the precharge pressure is greater than the system pressure.

In another aspect of the invention, a molding system for hydraulic blow molding of a container from a preform, the molding system comprising: a fill head unit, the fill head unit including a pressurization unit coupled to a nozzle assembly and to a source of molding medium in liquid form, the nozzle assembly further including a nozzle body with a seal pin slideably received within the nozzle body and being moveable between an opened position and a closed position, in the closed position an outlet of the nozzle body being closed by the seal pin; a mold assembly having mold halves defining a mold cavity in the shape of the container, the mold assembly being configured to receive the preform therein; and a controller coupled to the fill head unit, the controller being configured to raise the pressure of the molding medium in the fill head unit to a precharge pressure prior to injection of the molding medium into the preform and with the seal pin in the closed position.

In further aspect, the controller is further configured to initiate injection of the molding medium into the preform at the precharge pressure and subsequently raise the pressure of the molding medium above the precharge pressure during injection of the molding medium into the preform.

In additional aspect, a pressurization unit coupled to the controller.

In another aspect of the invention, the pressurization unit includes a fill piston received within a fill chamber.

In still another aspect, the fill piston is moveable between a retracted position and an extended position, the fill piston further having a precharge position located between the retracted position and the extended position.

In further aspect of the invention, the controller is configured to cause the fill piston to be moved to and held at the precharge position.

In yet another aspect, the fill piston is coupled to an actuator that moves the fill piston between its retracted position and extended position.

In another aspect, the actuator is a servo motor.

Further objects, features and advantages of this invention will become readily apparent to persons skilled in the art after a review of the following description, with reference to the drawings and claims that are appended to and form a part of this specification.

DETAILED DESCRIPTION

Referring now to the drawings, illustrated in the figures is a hydraulic blow molding system, generally designated and referred to as molding system 10, incorporating the principles of the present invention. As its primary components, the molding system 10 includes a fill head unit 12 and a mold assembly 14. As mentioned above, hydraulic blow molding uses a liquid as the molding medium. As the term is used herein, liquid is intended to include not only those liquids with a viscosity near water (e.g. beverages and non-beverages, including water, sports drinks, tea, etc.), but also those liquids with a viscosity substantially greater than water and generally referred to as viscous liquids (e.g. condiments and household products, including ketchup, dishwashing liquid, etc.).

The mold assembly 14 associated with the molding system 10 generally includes a pair of mold halves 16 that are hinged or otherwise connected so as to open and close, thereby allowing a preform 18 to be received therein. The mold halves 16 each having interior surfaces 20 that cooperate to define a mold cavity 22, which itself defines the shape of the container 24 (seen in FIGS. 4-6) formed by the molding system 10.

The preform 18 generally includes an elongated tubular body 26 that is bounded by and extends between a closed end 28 and an open end 30. Adjacent to the open end 30 are a finish 32, which may be threaded, and a handling ring 34, which respectively receive a closure cap (not shown) and assist in the handling of the preform 18 and resultant container 24.

The fill head unit 12 is generally comprised of a housing 36, a nozzle assembly 38, and a pressurization means or pressurization unit 40. The molding medium 42, which is also the end product that is being packaged within the container 24, is provided to the pressurization unit 40 from a source 44 and from the pressurization unit 40 through the housing 36 to the nozzle assembly 38. The nozzle assembly 38 will in turn direct the molding medium 42 into the preform 18 causing the preform to be axially stretched and radially expanded into conformity with the interior surfaces 20 defining the cavity 22.

Figure 1:
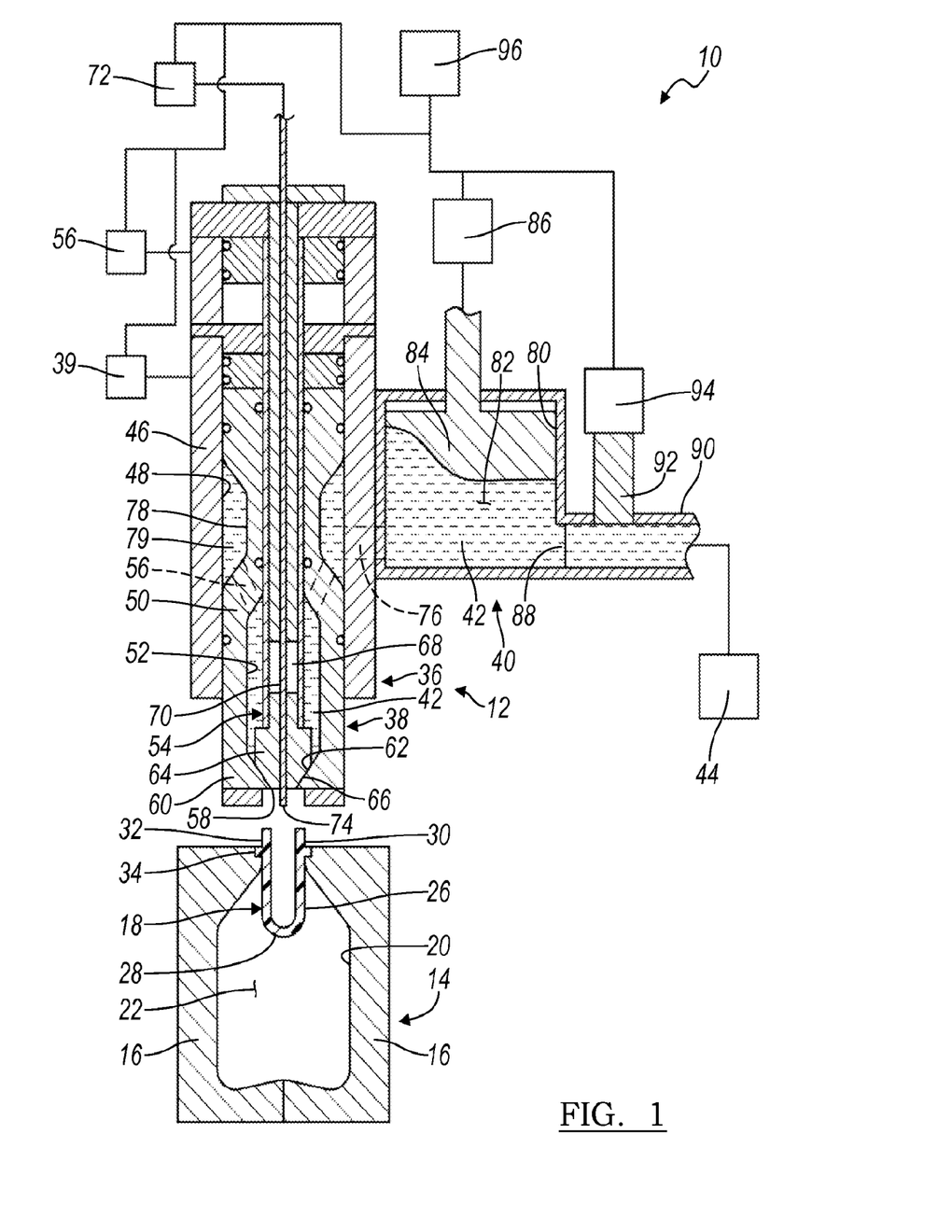
FIG. 1 is simplified, sectional view of a system, according to the principles of the present invention, for the hydraulic blow molding of a container.

As seen in FIG. 1, the nozzle assembly 38 is movably received within the housing 36. To receive the nozzle assembly 38, a bore 48 is defined longitudinally within the housing 36. The nozzle assembly 38 is further defined by a nozzle body 50 having portions defining a main bore 52 within which a seal pin 54 is slideably received. To effectuate movement of the seal pin 54, the seal pin 54 is coupled to an actuator 56. The actuator 56 may be any one of a well-known variety of actuators and may cause movement of the seal pin 54 by way of mechanical, electromechanical, servo, pneumatic, hydraulic or other actuation means.

Defined within the nozzle body 50, and more particularly within the main bore 52, are one or more inlets 56 and an outlet 58. The inlets 56 transverse the wall of the nozzle body 50 and may be equidistant spaced about a portion of the nozzle body 50 as is further described below. The outlet 58 is defined at the distal end 60 of the nozzle body 50 and defines the exit orifice from which the molding medium 42 is ejected into the preform 18. Also defined in the distal end 60 of the nozzle body 50 is a frustoconical surface that operates as a valve seat 62 and interacts with the seal pin 54 to seal and close off the outlet 58 during various stages of operation of the fill head unit 12.

Figure 4:
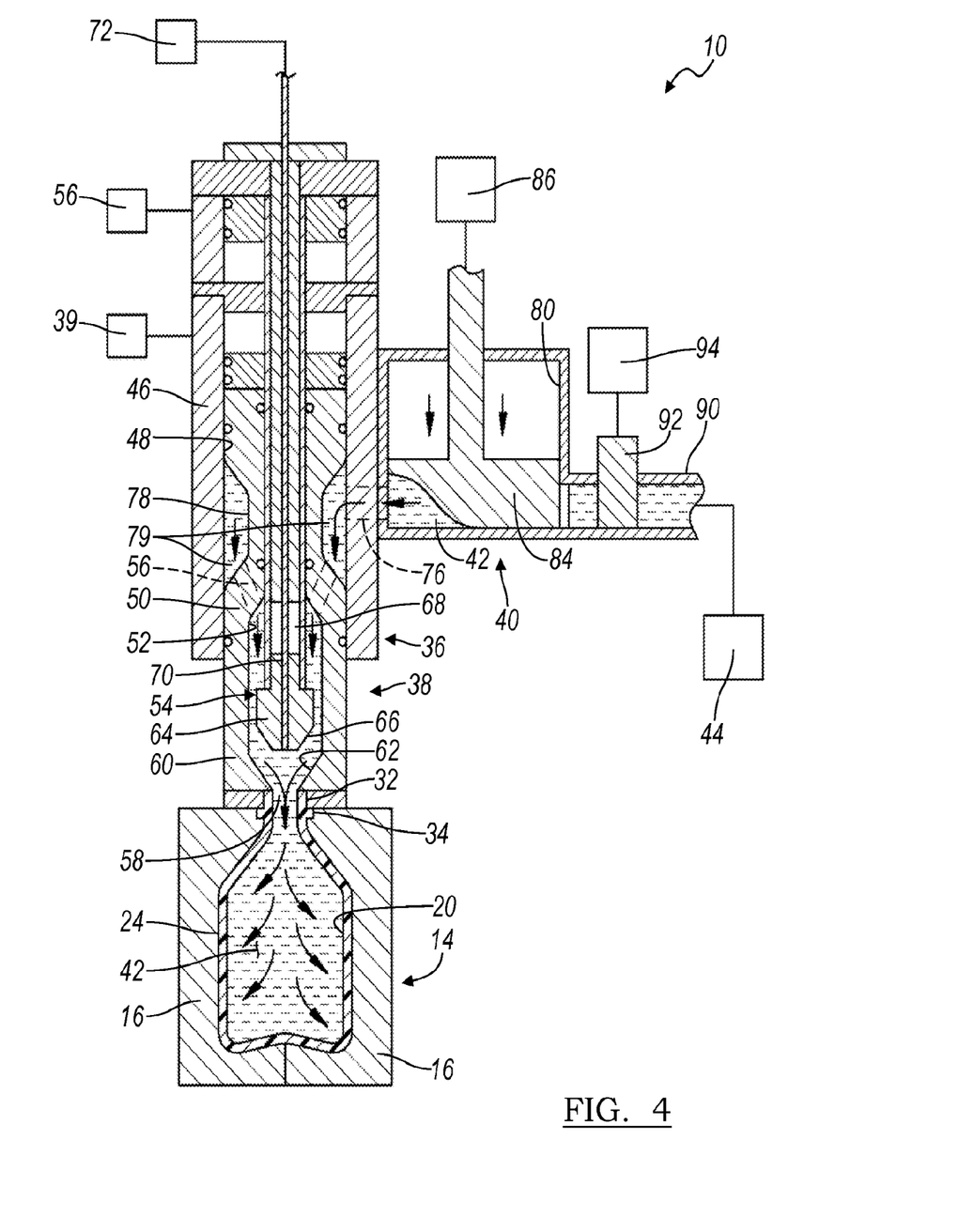
FIG. 4 is a sectional view of the system seen in FIG. 1 at another stage of the hydraulic blow molding process.

The seal pin 54, as noted previously, is slideable within the main bore 52 of the nozzle body 50. This sliding movement operates to translate the seal pin 54 between a closed position and an opened position. In the closed position, which is seen in FIG. 1, a distal end 64 of the seal pin 54 sealingly engages the valve seat 62 to close the outlet 58. More specifically, a sealing surface 66, which has a corresponding frustoconical shape, contacts the valve seat 62 to form a sealed engagement. In its opened position, the seal pin 54 is retracted by the actuator 56 such that the sealing surface 66 is spaced apart from the valve seat 62, thereby opening the outlet 58 of the nozzle assembly 38 and allowing the molding medium 42 to flow therethrough into the preform 18. The open position of the seal pin 54 is generally shown in FIG. 4.

Provided in a central bore 68 of the seal pin 54 is a stretch rod 70. The stretch rod 70 extends through the seal pin 54 and is movable between a retracted position and an extended position by an actuator 71. This actuator 71 may be of the same or different variety than the actuator 56 utilized in the displacing of the seal pin 54. In its retracted position, a tip 74 of the stretch rod 70 may be withdrawn into the distal end 60 of the seal pin 54 or located adjacent thereto. In its extended position, the stretch rod 70 is advanced such that the tip 74 extends into the body 26 of the preform 18. As further discussed below, axial stretching of the preform 18 is caused by engagement of the tip 74 with the closed end 28 of the preform 18, and subsequent advancement of the stretch rod 70.

The pressurization unit 40 provides the molding medium 42 to the nozzle assembly 38 through a discharge port 76 formed in the wall of the housing 46. In the area of the discharge port 76, portions along the exterior surface of the nozzle body 50 define a circumferential recess 78 that operates as receiving space 79 for receipt of the molding medium 42 from the discharge port 76. Opening into this receiving space 79 are the inlets 56 of the main bore 52, which therefore allow for the flow of the molding medium 42 into the main bore 52.

The pressurization unit 40 maybe any means by which the molding medium 42 can be pressurized during the molding. As such, the pressurization unit 40 may be a high-pressure pump, a piston and cylinder arrangement, or any other mechanism/arrangement that will allow the pressure of the molding medium 42 to be increased to a pressure suitable for molding of the container 24. As illustrated in the various figures, the pressurization unit 40 is a piston and cylinder arrangement. In this arrangement, a cylinder 80 defines a fill chamber 82 within which a fill piston 84 is reciprocally positioned. The fill piston 84 is coupled to an actuator 86, which may be any of the previously mentioned types of actuator, but it is preferably a servo motor. The fill piston 84 is accordingly movable between a retracted position, seen in FIG. 1, and an extended position, which is seen in FIG. 4.

To allow for the flow of the molding medium 42 into the fill chamber 82, the fill port 88 is defined in the wall of the cylinder 80. The fill port 88 is coupled by way of a feed line 90 to the source 44 of the molding medium 42, and an inlet valve 92, associated with the fill port 88, is movable by another actuator 94 so as to close off or keep open the feed line 90 during certain stages of operation of the molding system 10.

During operation, the molding system 10 begins a molding cycle with the nozzle assembly 38 retracted by its actuator 39 and disengaged from a preform 18 that has been positioned in the mold assembly 14 such that the body 26 of the preform 18 extends into the cavity 22 defined by the mold halves 16. Additionally, the seal pin 54 is in its closed position and the sealing surface 66 engages the valve seat 62 to close the outlet 58 and the main bore 52. The molding medium 42 is then provided from the source 44 and received in the fill chamber 82 through the fill port 76. Since the only constriction on the flowing of the molding medium 42 is the engagement of the sealing surface 66 with the valve seat 62, the molding medium 42 flows through the discharge port 76 and into the receiving space 79 defined by the recess 78. Since the inlets 56 are in communication with the receiving space 79, the molding medium 42 also flows through the inlets 56 and into the main bore 52 of the nozzle body 50.

This flow of the molding medium 42 into the fill chamber 82 is such that the fill chamber 82 becomes substantially completely or completely filled with the molding medium 42, as is the receiving space 79 and the main bore 52 defined in the nozzle body 50.

Figure 2:
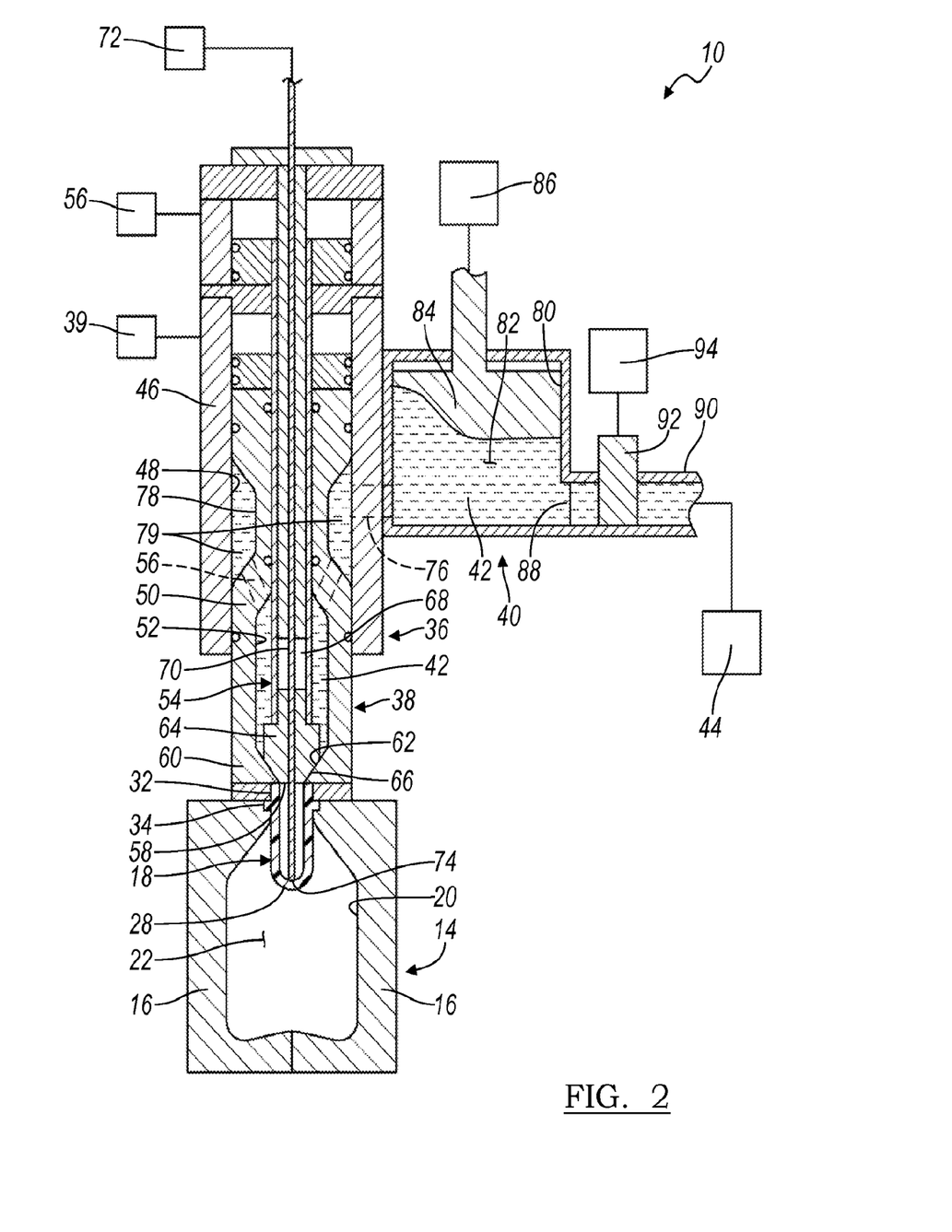
FIG. 2 is a sectional view of the system seen in FIG. 1 at a subsequent stage of the hydraulic blow molding process.

Once the various cavities, spaces and bores have been filled with the molding medium 42, the inlet valve 92 is closed, constraining the molding medium 42 therein. Generally around the time that the inlet valve 92 is closed, the nozzle body 50 and seal pin 54 are advanced together such that the distal end 60 of the nozzle body 50 engages the upper surfaces of the preform 18 and/or the upper surfaces of the mold assembly 14. The engagement of the nozzle body 50 with the upper surfaces of the preform 18 forms a fluid tight seal therebetween. Also around this time, the stretch rod 70 is advanced to the point where the tip 74 of the stretch rod 70 engages the closed-end 28 of the preform 18. The above is seen in FIG. 2.

Figure 3:
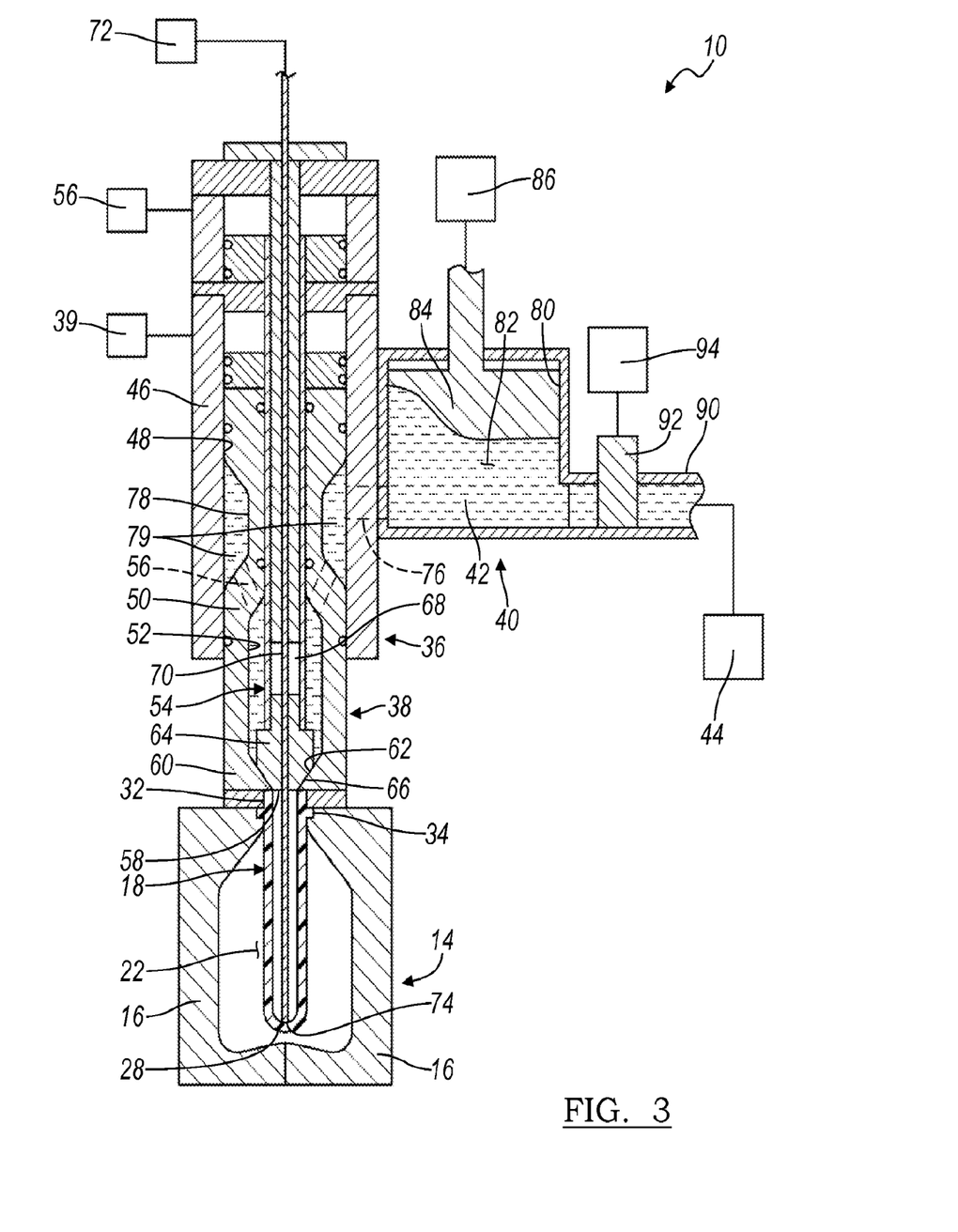
FIG. 3 is a sectional view of the system seen in FIG. 1 at another stage of the hydraulic blow molding process according to the principles of the present invention.

While the molding material 42 is being constrained in the molding system 10, or prior that constraining but after engagement of the nozzle body 50 with the upper surface of the preform 18, the stretch rod 70 is advanced to axially stretch the preform 18. This is illustrated in FIG. 3. The stretch rod 70 may then be retracted to a position where the tip 74 of the stretch rod 70 is flush with, adjacent to or slightly receded within the distal end 64 of the seal pin 54.

As also seen in FIG. 3, while the seal pin 54 is still engaged with the nozzle body 50 at their distal ends 60, 64 and after the inlet valve 92 has been closed, the fill piston 84 is partially advanced by its associated actuator 86 to a precharge position. This partial advancement of the fill piston 84 within the cylinder 80 operates to precharge the molding medium 42 constrained within fill head unit 12 of the molding system 10. The advancement of the fill piston 84 is such that system pressure of the molding medium 42 within in the fill head unit 12 is raised to a precharge pressure of at least 3 bar, and more preferably at least 5 bar. Precharging the molding medium 42 to the precharge pressure drives the molding medium 42 into the preform 18, upon opening of the seal pin 54, with sufficient initial acceleration and velocity that the molding medium 42 does not contact the material of the preform 18 for too long a length of time before the container 24 is fully formed. In other words, premature contact of the molding medium 42 with the material of the preform 18 does not occur. Precharging below these precharge pressures produces inconsistent molding results of the type previously discussed.

After the fill head unit 12 has been precharged, the seal pin 54 is moved to its open position, opening the outlet 58, and the fill piston 84 is driven to its extended position, as seen in FIG. 4. As a result, the molding medium 42 is caused to flow from the fill chamber 82, through the receiving space 79, into the main bore 52, and be injected into the preform 18. Upon opening of the outlet 58, the pressure in the molding system 10 initially drops, but quickly recovers and increases to the precharge pressure, and thereafter rises above the precharge pressure. The accompanying flow of the molding medium 42 causes the preform 18 to expand into conformity with the interior surfaces 20 and into the desired shape. Thus, the precharging of the molding medium 42 increases the initial acceleration experienced by the molding medium 42 when the outlet 58 is opened, as compared to a system without precharging. This in turn decreases the overall amount time that the molding medium 42 is in contact with the material of the preform 18 before the preform 18 has been fully expanded into the shape of the container 24 as a result of the fill piston 84 being driven to its extended position. Thus, the amount of heat that can be removed from the preform 18 before it is fully formed into the container is reduced.

The precharge position of the fill piston 84 and the precharging of the molding medium 42 can be achieved in at least two ways. According to one method, the fill piston 84 is moved to the precharge position seen in FIG. 3 and stopped and held at this position. Thereafter, the seal pin 54 is moved to its open position in the fill piston 84 is moved from the precharge position to its extended position. According to another method of operation, the fill piston 84 is not stopped and held at the precharge position. Rather, the fill piston 84 is moved from its retracted position (seen in FIG. 2) and the movement of the seal pin 54 to its opened position is timed such that this movement of the seal pin 54 occurs when the fill piston 84 has reached the precharge position (seen in FIG. 3) and/or the molding medium 42 has reached the precharge pressure. Thus, the precharging of the molding medium 42 is performed as a first part of a continuous increasing of the pressure of the molding medium 42 from the system pressure during the injection of the molding medium 42 into the preform.

Control of the timing of the opening of the seal pin 54 can also be achieved in several ways. Firstly, retraction of the seal pin 54 can be controlled based on an elapsed time after initiation of the extending of the fill piston 84, which may be determined by an internal clock of a controller 96 associated with the molding system 10. (The controller 96 is illustrated in FIG. 1, but omitted from the remaining figures for clarity purposes.) Secondly, retraction of the seal pin 54 can be controlled based upon the fill piston 84 being extended a predetermined length or reaching a predetermined position, which may be determined by position sensors associated with the fill piston 84. Thirdly, retraction of the seal pin 54 can be initiated upon the reaching of a predetermined precharge pressure within the fill chamber 82, which may be determined by the pressure sensors coupled to the fill chamber 82.

Figure 5:
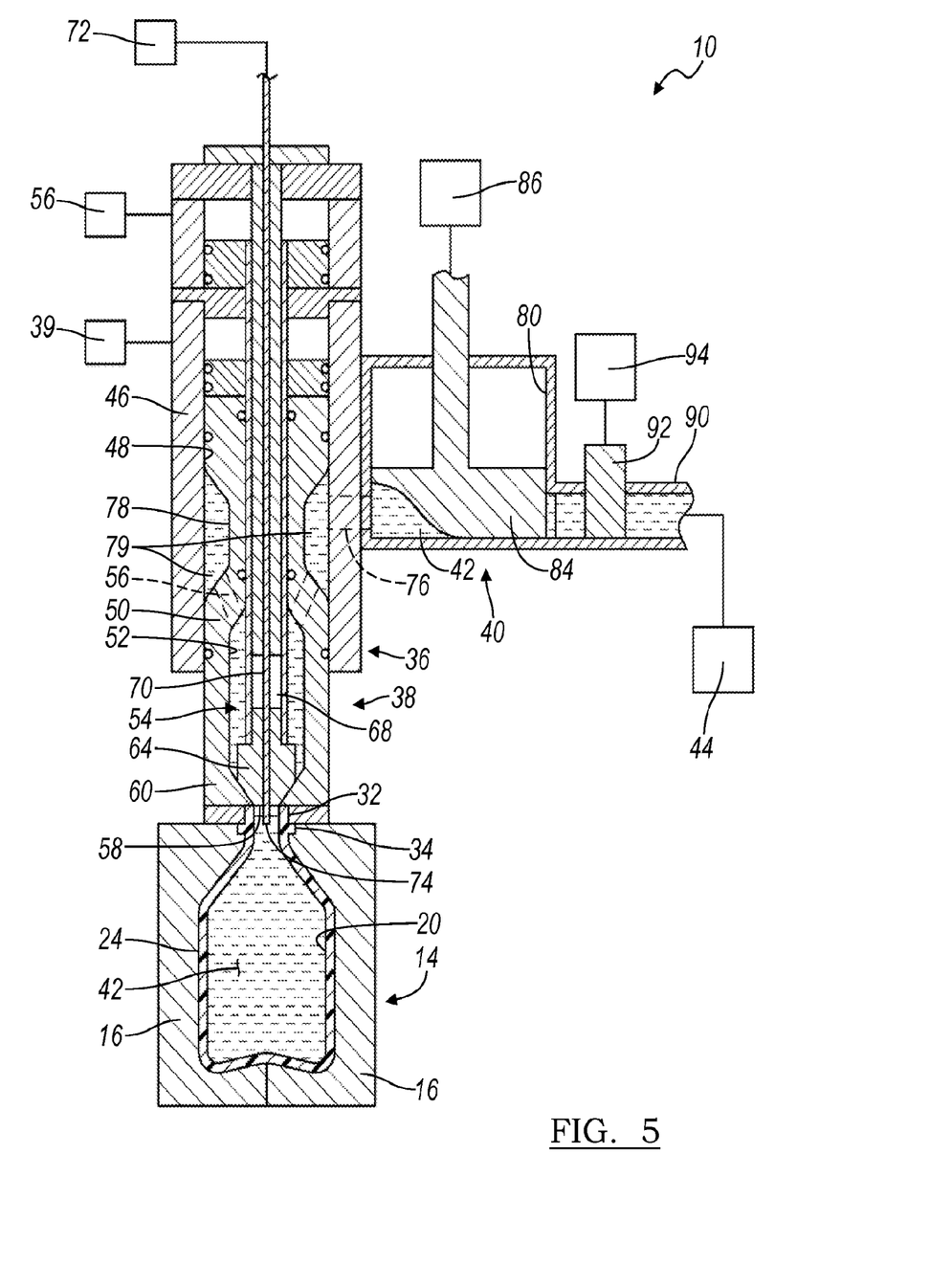
FIG. 5 is a sectional view of the system seen in FIG. 1 at yet a further stage of the hydraulic blow molding process according to the present invention.
Figure 6:
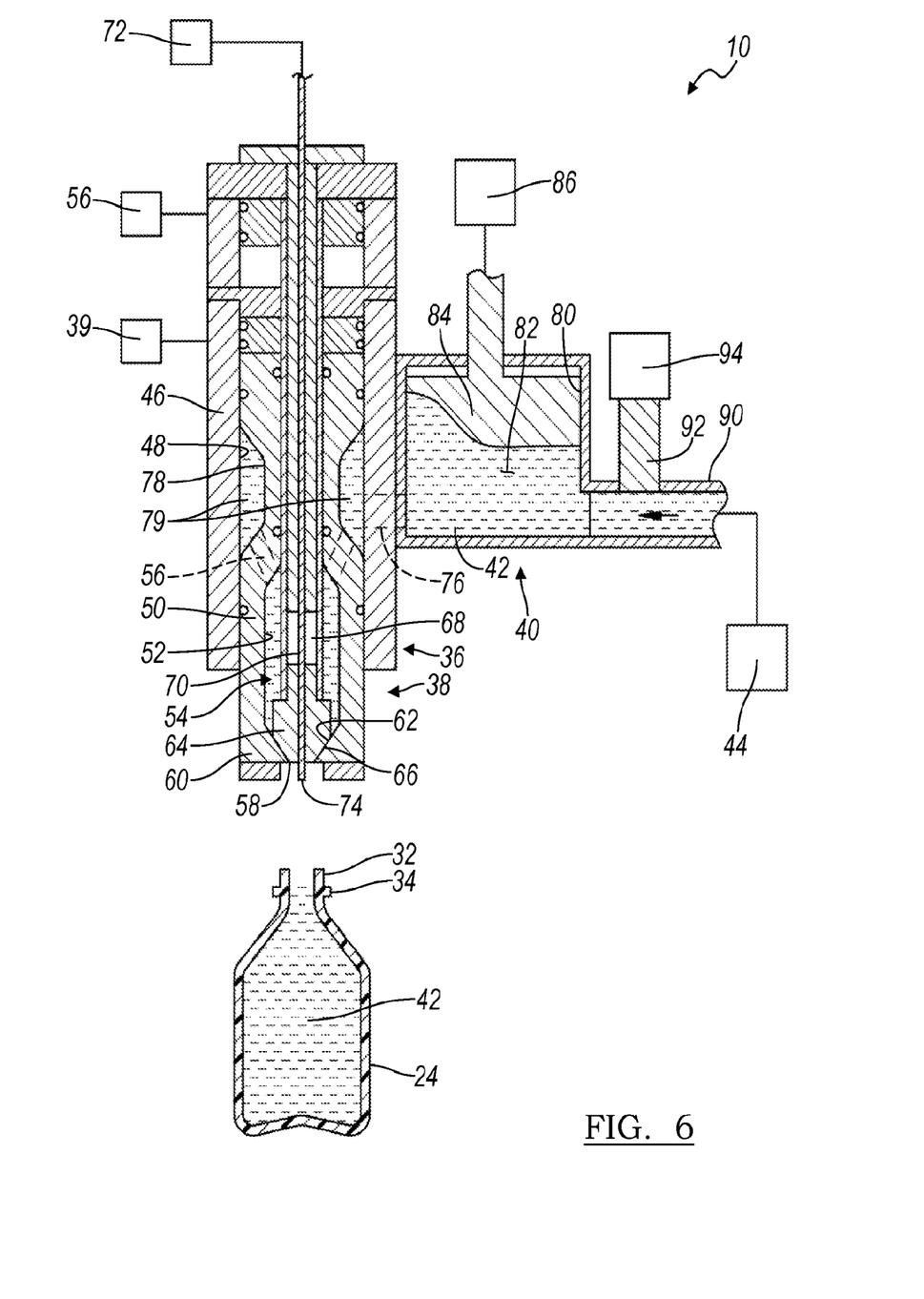
FIG. 6 is a sectional view of the system seen in FIG. 1 at still another stage of the hydraulic blow molding process according to the principles of the present invention.

Once the container 24 has been formed by and filled with the molding medium 42, the seal pin 54 is again moved to its closed position, which is seen in FIG. 5. Prior to the closing of the outlet 58 by the seal pin 54, the stretch rod 70 may be extended into the finish 32 of the container 24 and the molding medium 42 in order to set the final fill height of the molding medium 42 in the container 24.

Upon disengagement of the nozzle assembly 38 from the container 24 and mold assembly 14, and upon withdrawal of the stretch rod 70 from the molding medium 42, the fill height of the molding medium 42 will lower or drop by an amount equal to the volume of liquid that was being displaced by the stretch rod 70. The container 24 filled with the molding medium 42, which is the desired end product, may then be removed from the mold assembly 14. With the seal pin 54 in its closed position, the inlet valve 92 may be opened and the fill piston 84 moved to its retracted position, thereby allowing the fill chamber 82 to refill with the molding medium 42 from the source 44. At this point, the process or cycle of the molding system 10 is repeated to form and fill another container 24.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A method of operating a molding system for hydraulic blow molding of a container from a preform, the molding system including a fill head unit, the method comprising the steps of:
   providing a molding medium in liquid form and at a system pressure to the fill head unit;
   precharging the molding medium within the fill head unit to a precharge pressure, the precharging pressure being greater than the system pressure; and
   after precharging of the molding medium, injecting the molding medium from the fill head unit into the preform causing the preform to expand into the shape of the container under the influence of the molding medium.

2. The method of claim 1, further comprising that, during the step of injecting of the molding medium into the preform, increasing the pressure of the molding medium to a pressure greater than the precharge pressure.

3. The method of claim 1, further comprising the step holding the molding medium at the precharge pressure.

4. The method of claim 3, wherein an outlet of the fill head unit is opened after the molding medium has been held at the precharge pressure.

5. The method of claim 1, wherein the precharge pressure is at least 3 bar.

6. The method of claim 1, wherein the precharge pressure is at least 5 bar.

7. The method of claim 1, wherein an outlet of the nozzle body is closed when the molding medium is provided to the fill head unit and the outlet is opened after precharging the molding medium to the precharge pressure.

8. The method of claim 7, wherein the outlet is opened by retracting the seal pin within the nozzle body.

9. The method of claim 1, wherein molding medium is initially injected into the preform at the precharge pressure.

10. The method of claim 9, wherein subsequent to the injecting of the molding medium into the preform at the precharge pressure, the molding medium is injected into the preform at a pressure greater than the precharge pressure.

11. The method of claim 1, wherein the pressurization unit includes a fill piston located within a fill chamber containing the molding medium, the fill piston being moved to a precharge position during the precharging step.

12. The method of claim 11, wherein the fill piston is moved to the precharge position by an actuator.

13. The method of claim 1, wherein the molding medium is provided to the fill head unit at a system pressure and the precharge pressure is greater than the system pressure.

14. A molding system for hydraulic blow molding of a container from a preform, the molding system comprising:
- a fill head unit, the fill head unit including a pressurization unit coupled to a nozzle assembly and to a source of molding medium in liquid form, the nozzle assembly further including a nozzle body with a seal pin slideably received within the nozzle body and being moveable between an opened position and a closed position, in the closed position an outlet of the nozzle body being closed by the seal pin;
- a mold assembly having mold halves defining a mold cavity in the shape of the container, the mold assembly being configured to receive the preform therein; and
- a controller coupled to the fill head unit, the controller being configured to raise the pressure of the molding medium in the fill head unit to a precharge pressure prior to injection of the molding medium into the preform and with the seal pin in the closed position.

15. The molding system of claim 14, wherein the controller is further configured to initiate injection of the molding medium into the preform at the precharge pressure and subsequently raise the pressure of the molding medium above the precharge pressure during injection of the molding medium into the preform.

16. The molding system of claim 14, further comprising a pressurization unit coupled to the controller.

17. The molding system of claim 16, wherein the pressurization unit includes a fill piston received within a fill chamber.

18. The molding system of claim 17, wherein the fill piston is moveable between a retracted position and an extended position, the fill piston further having a precharge position located between the retracted position and the extended position.

19. The molding system of claim 17, wherein the controller is configured to cause the fill piston to be moved to and held at the precharge position.

20. The molding system of claim 17, wherein the fill piston is coupled to an actuator that moves the fill piston between its retracted position and extended position.

21. The molding system of claim 20, wherein the actuator is a servo motor.

* * * * *